United States Patent [19]

Kato

[11] Patent Number: 5,504,624
[45] Date of Patent: Apr. 2, 1996

[54] AFOCAL ZOOMING OPTICAL SYSTEM

[75] Inventor: Hiroyuki Kato, late of Kawagoe, Japan, by Ryota Ogawa, legal representative

[73] Assignee: Asashi Kogaku Kogyo Kabushiki Kaisha, Tokyo, Japan

[21] Appl. No.: 799,970

[22] Filed: Nov. 29, 1991

(Under 37 CFR 1.47)

[30] Foreign Application Priority Data

Nov. 30, 1990 [JP] Japan ..................................... 2-335936

[51] Int. Cl.⁶ .................................................... G02B 15/14
[52] U.S. Cl. ............................ 359/687; 359/676; 359/684
[58] Field of Search ...................................... 359/684, 687, 359/676

[56] References Cited

U.S. PATENT DOCUMENTS

| | | | |
|---|---|---|---|
| 4,492,437 | 1/1985 | Masumoto et al. | 359/685 |
| 4,676,581 | 6/1987 | Roberts | 359/676 |
| 4,684,223 | 8/1987 | Ikemori et al. | 359/684 |
| 5,136,431 | 8/1992 | Terasawa et al. | 359/684 |
| 5,191,475 | 3/1993 | Terasawa et al. | 359/684 |

*Primary Examiner*—Scott J. Sugarman
*Attorney, Agent, or Firm*—Sughrue, Mion, Zinn, Macpeak & Seas

[57] ABSTRACT

An afocal zooming optical system comprising a plurality of lens groups or components, in which the lens groups movable along the optical axis for zooming do not include the lens group closest to the eye, with the lens group positioned closest to the eye being movable for dioptry adjustment.

6 Claims, 9 Drawing Sheets

1

AFOCAL ZOOMING OPTICAL SYSTEM

BACKGROUND OF THE INVENTION

This application is based on and claims priority from Japanese Application No. HEI 2-335936 filed Nov. 30, 1990, the disclosure of which is incorporated herein by reference.

The present invention relates to an afocal optical system for use with binoculars and monoculars, particularly to a zooming optical system capable of changing the magnification.

Throughout this specification, the terms "group" and "component" are used interchangeably to refer to a structure comprising at least one lens element.

Eyepiece optical systems such as binoculars are often provided with a dioptry adjustment capability for adjusting the focus in accordance with the eyesight of the user. With zooming optical systems which are capable of adjusting the magnification (focal length), a reference dioptry which does not change with the magnification is determined at the design stage.

If there is even partial overlap between the lens group movable for dioptry adjustment and the lens group movable for zooming, the change in dioptry due to zooming cannot be suppressed for all dioptries. Under these circumstances, a dioptry most commonly used is specified as a reference and the system is designed in such a way that zooming will cause no change in dioptry at least in the case where the system is set for the reference dioptry. Hence, there will be no change in dioptry due to magnification alterations if the system is set for the reference dioptry. However, if the system is set for values other than the reference dioptry, magnification alterations will cause changes in dioptry, and another dioptry adjustment becomes necessary.

FIG. 15 shows a conventional zooming optical system. An objective optical unit that is positioned closer to the object than a field ring S is composed of a fixed first lens group G1 and a second lens group G2 movable for zooming, whereas an eyepiece optical unit positioned closer to the eye than the field ring S is composed of a third lens group G3 movable for zooming and a fourth lens group G4 that is fixed during zooming. Dioptry adjustment is effected by moving altogether the three lens groups enclosed with a dashed line, i.e., the second lens group G2, the third lens group G3 and the fourth lens group G4.

A problem with this prior art zooming optical system is that the lens groups movable for dioptry adjustment experience a great change in focal length during zooming, since those dioptry adjusting lens groups contain all of the lens groups G2 and G3 which have a zooming capability. The eyesight mismatch decreases with the decreasing change in the focal lengths of the dioptry adjusting groups, so a great eyesight mismatch will inevitably occur in the conventional system.

SUMMARY OF THE INVENTION

It is an object of the present invention to provide an afocal zooming optical system that is capable of preventing the occurrence of eyesight mismatch during zooming.

This and other objects of the present invention can be attained by an afocal zooming optical system comprising a plurality of lens groups or components, in which the lens groups movable along the optical axis for zooming do not include the lens group closest to the eye, with the lens group positioned closest to the eye being movable for dioptry adjustment.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENT

Figure 1:
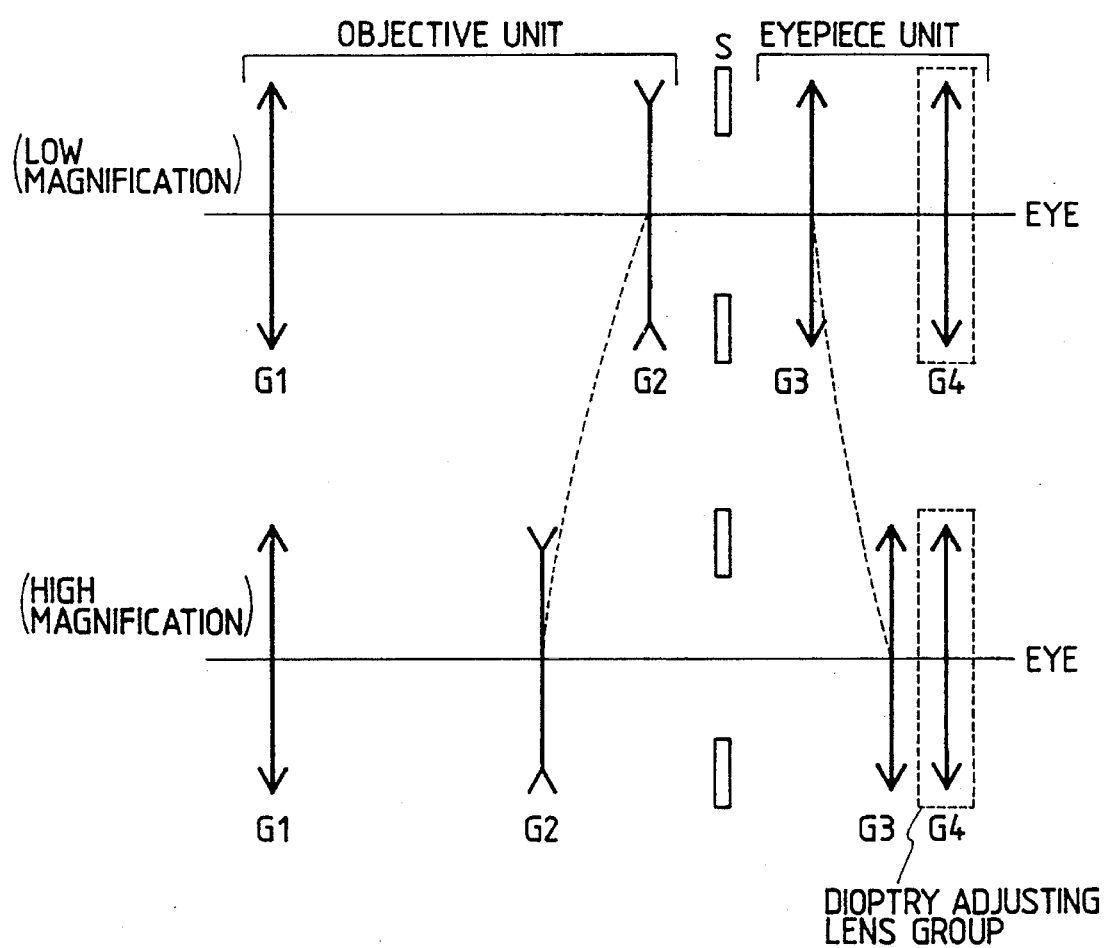
FIG. 1 is a schematic diagram illustrating the operation of an afocal zooming optical system according to the present invention.

FIG. 1 shows a four-group zoom lens system as an embodiment of the present invention. An objective optical unit that is positioned closer to the object than a field ring S is composed of a fixed first lens group G1 and a second lens group G2 movable for zooming. An eyepiece optical unit that is positioned closer to the image than the field ring S is composed of a third lens group G3 movable for zooming and a fourth lens group G4 that is fixed during zooming. Dioptry adjustment is effected by moving only the fourth lens group G4. Alternately, it is possible to the dioptry adjustment is effected by moving only a part of the fourth lens groups G4, the part being located close to the eye.

Figure 2:
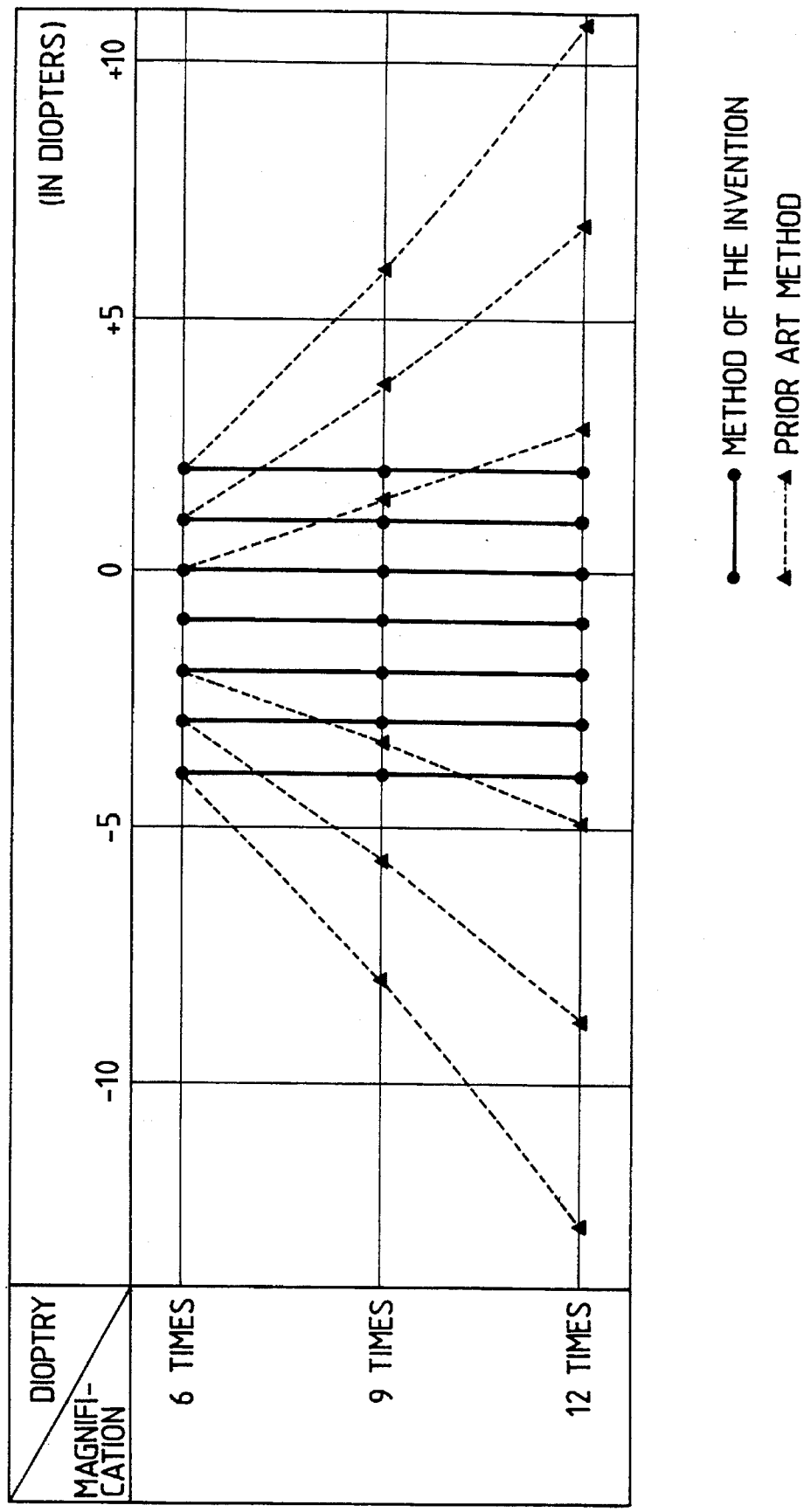
FIG. 2 is a graph comparing eyesight mismatch for the case of a conventional lens system and the system of FIG. 1.
Figure 15:
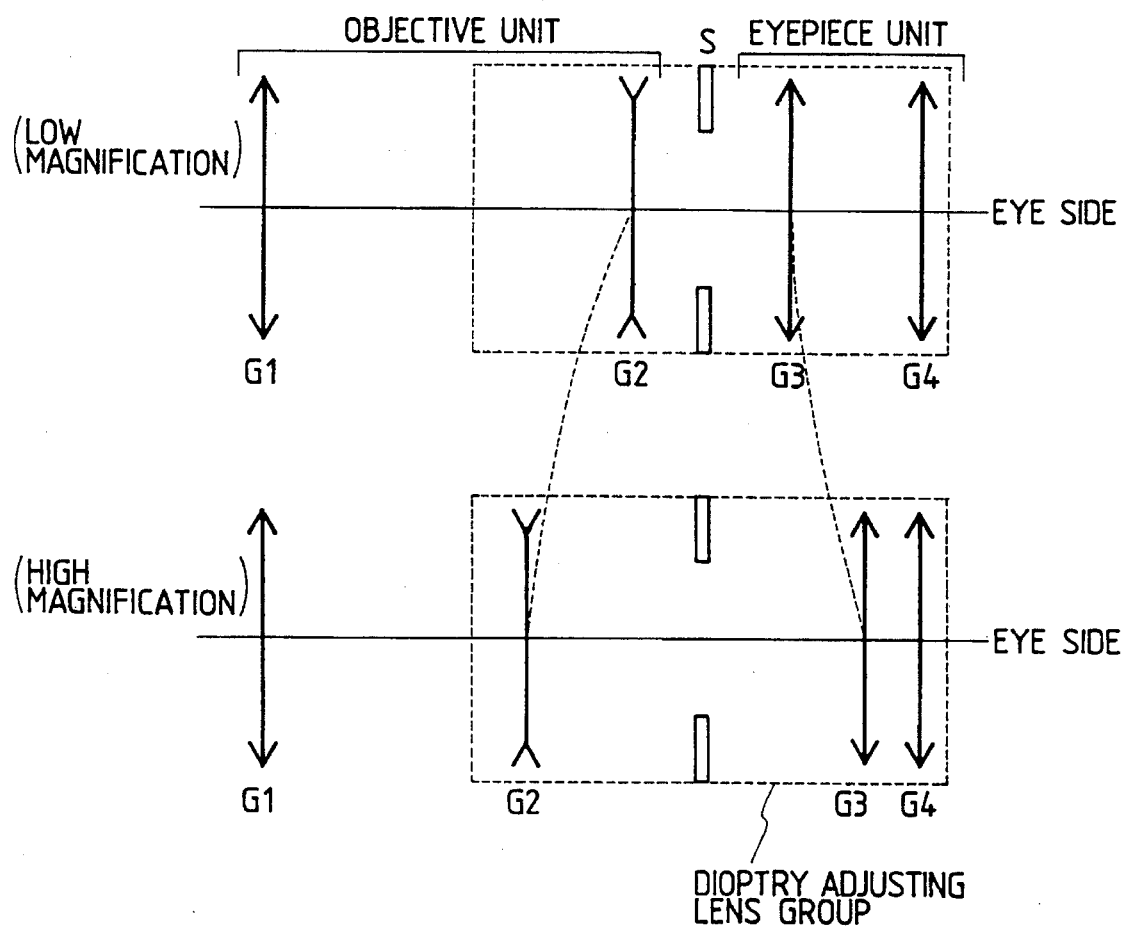
FIG. 15 is an illustration for explaining a conventional afocal zooming optical system.

FIG. 2 compares the eyesight mismatch between two cases, one being such that dioptry adjustment is effected with a four-group zoom lens system by the method illustrated in FIG. 1 and the other being the case where dioptry adjustment is effected with a zoom lens system of the same composition by the conventional method shown in FIG. 15. The result obtained by the embodiment of the invention represented in FIG. 1 is indicated by solid lines, wherein the composition of the lens system is set forth later herein. The result obtained by the conventional method is indicated by dashed lines.

As one can see from FIG. 2, the occurrence of eyesight mismatch during zooming is negligible if the zooming lens groups are not included as dioptry adjusting lens groups.

If the four-group composition described above is to be adopted, it is desirable that the following condition be satisfied:

$$fG4/fG3<2.0 \qquad (1)$$

where fG3 and fG4 denote the focal lengths of the third and fourth lens groups, respectively.

Condition (1) specifies the power of the fourth lens group (i.e., the dioptry adjusting lens group) in relation to the power of the third lens group. If fG4/fG3 exceeds 2.0, the amount of movement that the fourth lens group must make for dioptry adjustment increases and the size of the eyepiece lens unit will accordingly become bulky.

Specific examples of a preferred lens composition according to the present invention will now be described.

Figure 3:
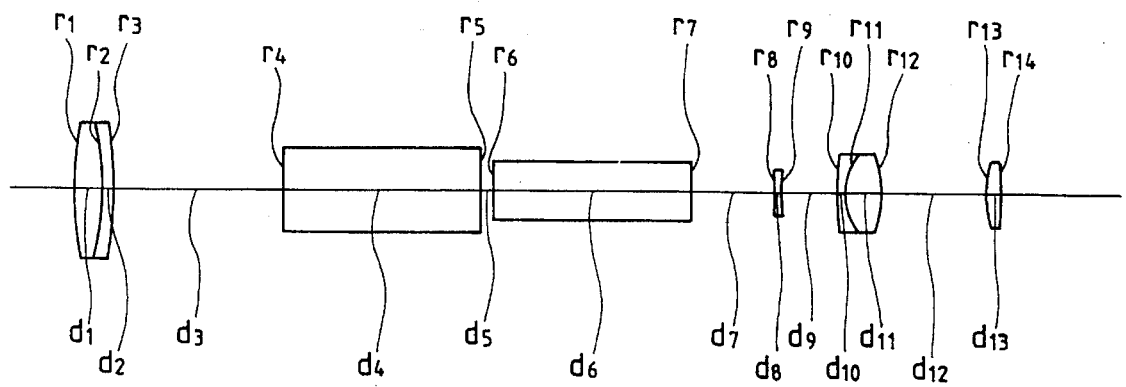
FIGS. 3, 5 and 7 illustrate a first embodiment of the lens system according to the present invention in low magnification, moderate magnification and high magnification positions, respectively.
Figure 5:
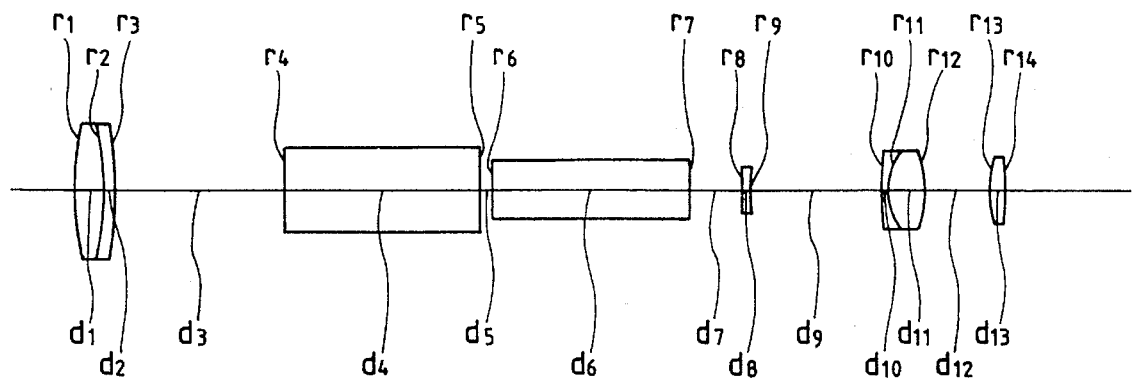
Figure 7:
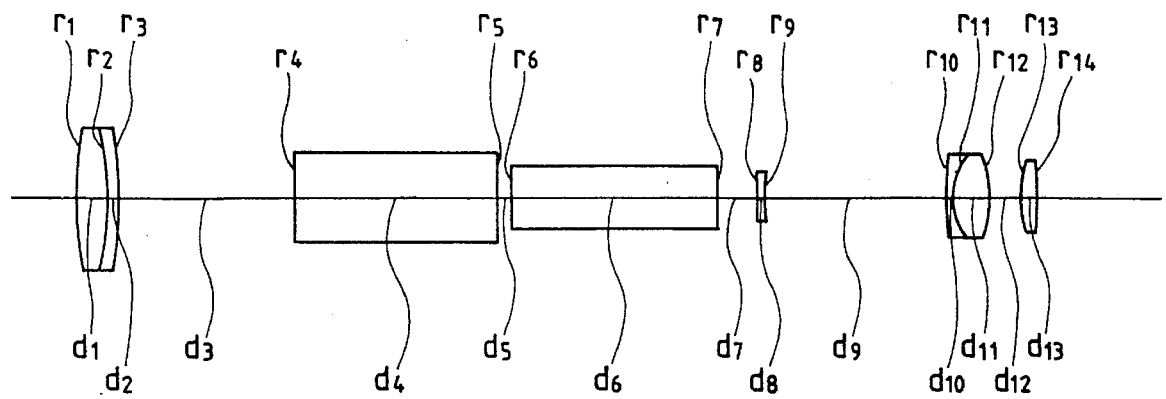

FIGS. 3, 5 and 7 show a first example of the lens composition for the zooming optical system of the present invention, with FIG. 3 illustrating the case of low magnification, FIG. 5 illustrating the case of moderate magnification, and FIG. 7 illustrating the case of high magnification.

Specific numeric data for the system are given in Table 1. The magnification is altered by changing d7, d9 and d12, and the numeric data for the respective alterations are given in Table 2. The fourth to the seventh surfaces are those of erecting prisms.

Figure 9:
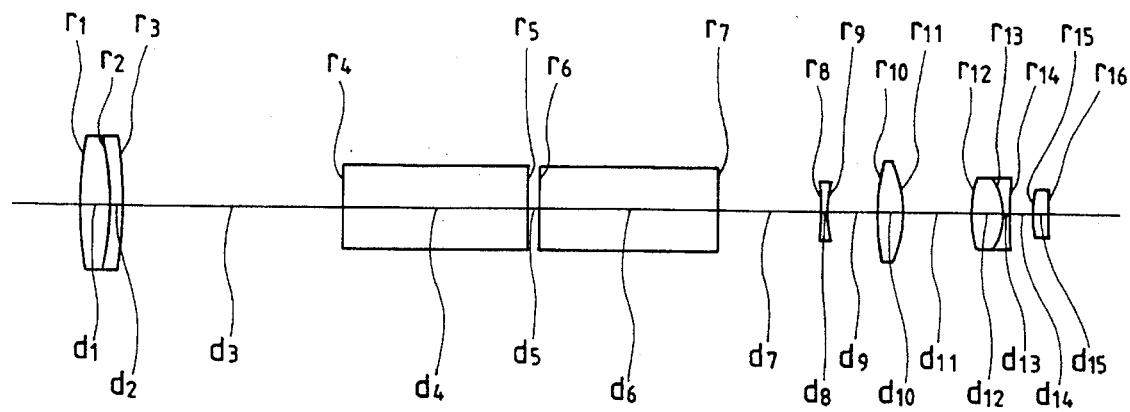
FIGS. 9, 11 and 13 illustrate a second embodiment of the lens system according to the invention in low magnification, moderate magnification on and high magnification positions, respectively.
Figure 11:
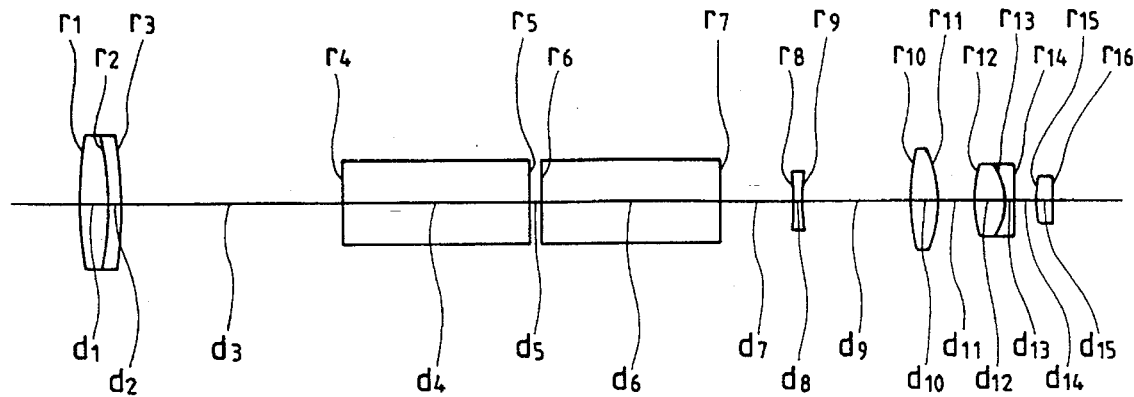
Figure 13:
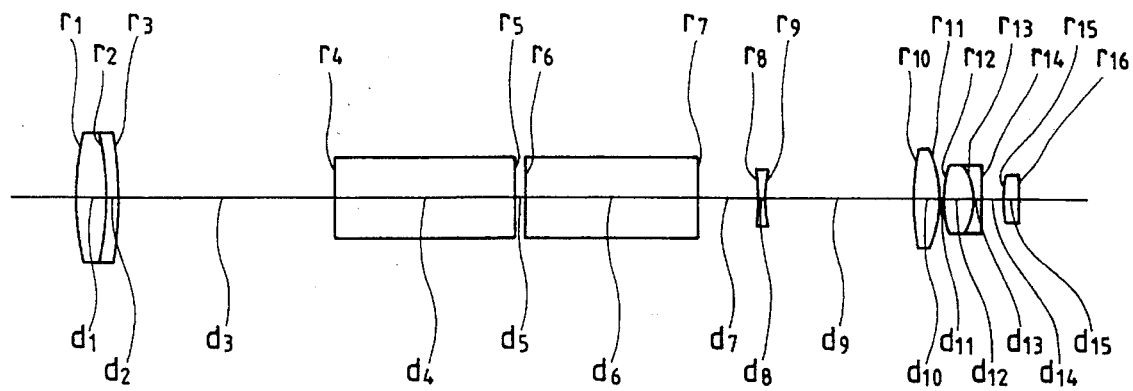

FIGS. 9, 11 and 13 show a second example of the lens composition for the zooming optical system of the invention, with FIG. 9 illustrating the case of low magnification, FIG. 11 illustrating the case of moderate magnification, and FIG. 13 illustrating the case of high magnification.

Specific numerical data for the system are given in Table 4. The magnification is altered by changing d7, d9 and d11, and the numeric data for the respective alterations are given in Table 5. The fourth to the seventh surfaces are those of erecting prisms.

In Tables 1, 2, 4 and 5, r is the radius of curvature of an individual lens surface, d is the lens thickness or the air space between lenses, n is the refractive index of a lens, ν is the Abbe number of a lens, fC is the focal length of the objective optical unit comprising the first to the ninth surfaces, fe is the focal length of the eyepiece optical unit including surfaces 10 through 14, and ω is the half view angle. In the drawings, ER is the eye ring, ERφ means a diameter of the eye ring, B is the angle defined by the optical axis and the principal ray of the exit pupil light flux.

TABLE 1

| Surface No. | r | d | n | ν |
|---|---|---|---|---|
| 1 | 52.948 | 4.63 | 1.51633 | 64.1 |
| 2 | −34.372 | 1.35 | 1.62004 | 36.3 |
| 3 | −115.196 | 25.05 | | |
| 4 | ∞ | 28.64 | 1.56883 | 56.3 |
| 5 | ∞ | 1.68 | | |
| 6 | ∞ | 28.64 | 1.56883 | 56.3 |
| 7 | ∞ | variable | | |
| 8 | −46.072 | 1.10 | 1.51633 | 64.1 |
| 9 | 18.902 | variable | | |
| 10 | 49.608 | 1.10 | 1.80518 | 25.4 |
| 11 | 9.040 | 5.47 | 1.71300 | 53.8 |
| 12 | −14.836 | variable | | |
| 13 | 17.088 | 2.19 | 1.51633 | 64.1 |
| 14 | −66.424 | | | |

TABLE 2

| | Low Magnification | Moderate Magnification | High Magnification |
|---|---|---|---|
| f0 | 100.000 | 127.149 | 145.188 |
| fe | 16.949 | 14.125 | 12.473 |
| ω | 2.50° | 1.94° | 1.67° |
| d7 | 12.20 | 7.61 | 5.51 |

TABLE 2-continued

| | Low Magnification | Moderate Magnification | High Magnification |
|---|---|---|---|
| d9 | 8.20 | 18.72 | 25.54 |
| d12 | 14.96 | 9.02 | 4.30 |

Figure 4:
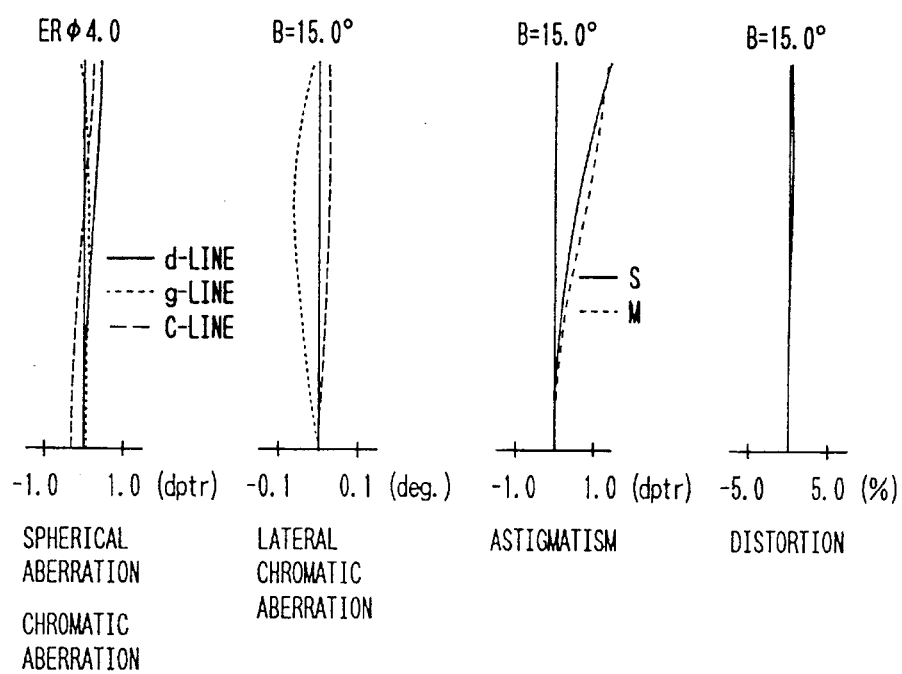
FIGS. 4, 6 and 8 are graphs plotting the aberration curves for the lens system illustrated in FIGS. 3, 5 and 7, respectively.
Figure 6:
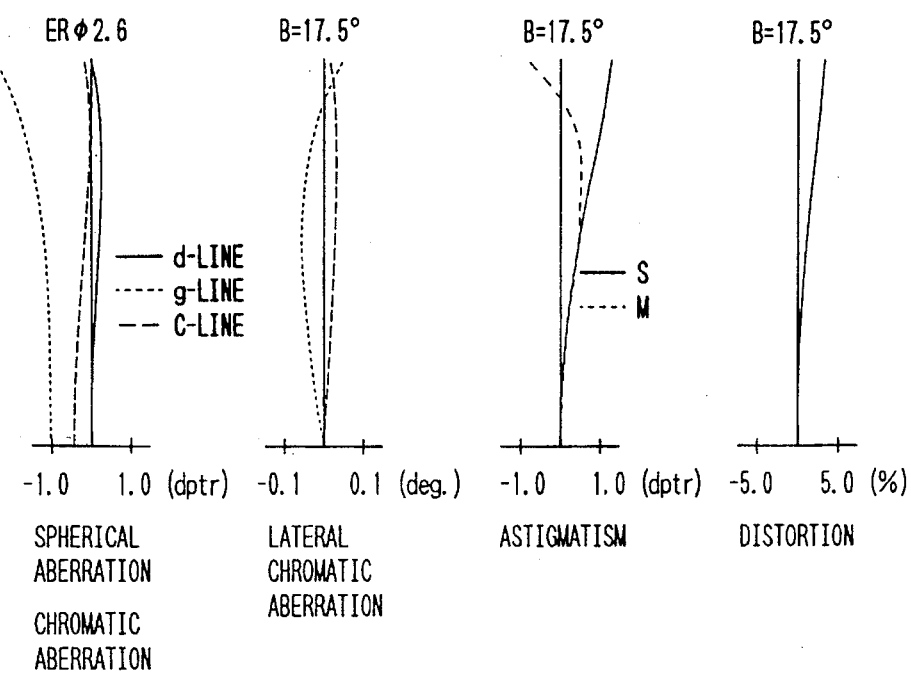
Figure 8:
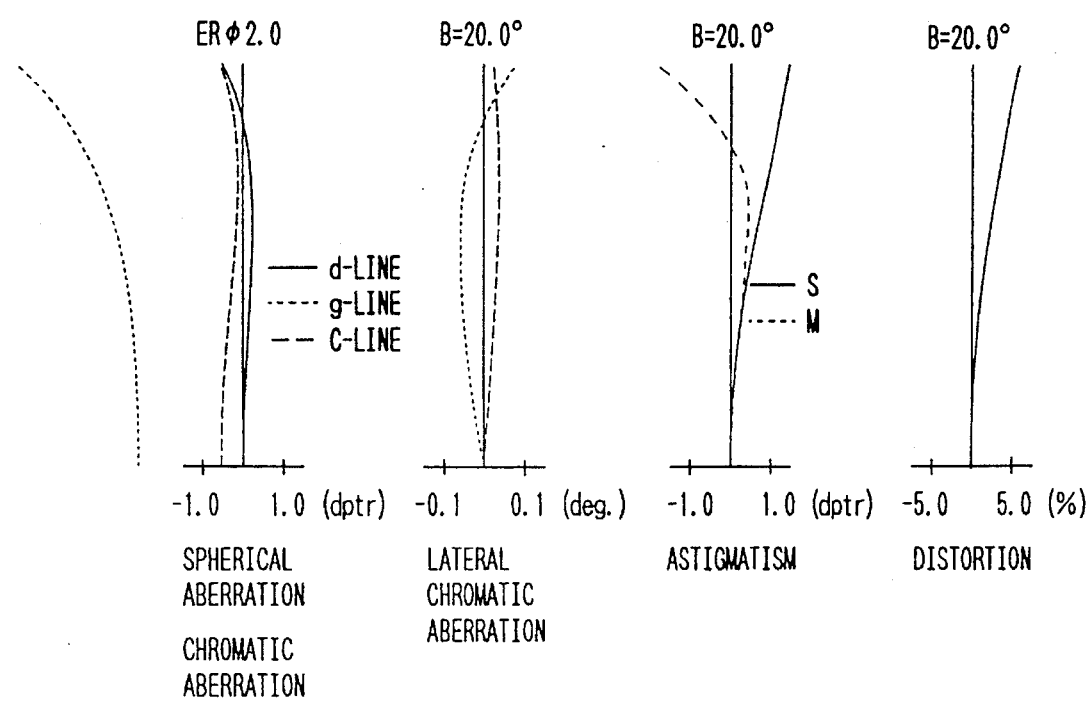

The aberration curves obtained with this lens composition are plotted in FIG. 4 for low magnification, in FIG. 6 for moderate magnification and in FIG. 8 for high magnification.

The results of a comparative experiment in which dioptry adjustment was effected by moving the second, third and fourth lens groups in unison are shown in the following Table 3.

TABLE 3

| Low magnification | Moderate magnification | High magnification |
|---|---|---|
| −4.0 | −8.0 | −12.8 |
| −2.0 | −3.4 | −4.9 |
| −1.0 | −1.0 | −1.0 |
| 0.0 | +1.4 | +2.9 |
| +2.0 | +6.0 | +10.8 |

TABLE 4

| Surface No. | r | d | n | ν |
|---|---|---|---|---|
| 1 | 67.982 | 5.59 | 1.51009 | 63.6 |
| 2 | −47.887 | 1.80 | 1.62364 | 36.5 |
| 3 | −161.038 | 40.70 | | |
| 4 | ∞ | 34.00 | 1.56883 | 56.3 |
| 5 | ∞ | 2.00 | | |
| 6 | ∞ | 33.00 | 1.56883 | 56.3 |
| 7 | ∞ | variable | | |
| 8 | −26.742 | 1.34 | 1.51633 | 64.1 |
| 9 | 22.235 | variable | | |
| 10 | 41.073 | 5.00 | 1.71300 | 53.8 |
| 11 | −19.675 | variable | | |
| 12 | 20.784 | 5.88 | 1.60311 | 60.7 |
| 13 | −11.072 | 1.30 | 1.76182 | 26.6 |
| 14 | 89.368 | variable | | |
| 15 | 19.736 | 3.00 | 1.51633 | 64.1 |
| 16 | −484.218 | | | |

TABLE 5

| | Low Magnification | Moderate Magnification | High Magnification |
|---|---|---|---|
| f0 | 130.824 | 173.777 | 206.075 |
| fe | 18.620 | 15.799 | 13.782 |
| ω | 2.70° | 1.86° | 1.54° |
| d7 | 18.84 | 13.92 | 11.57 |
| d9 | 9.09 | 19.85 | 27.87 |
| d11 | 12.39 | 6.54 | 0.89 |

In the second example, the dioptry adjustment is effected by moving the lens element, close to the eye, of the fourth lens group G4 back and forth along the optical axis.

TABLE 6

| dioptry adjustment range | −3.5D | −1.0D | +0D |
|---|---|---|---|
| d14 | 0.26 | 4.00 | 5.35 |

Figure 10:
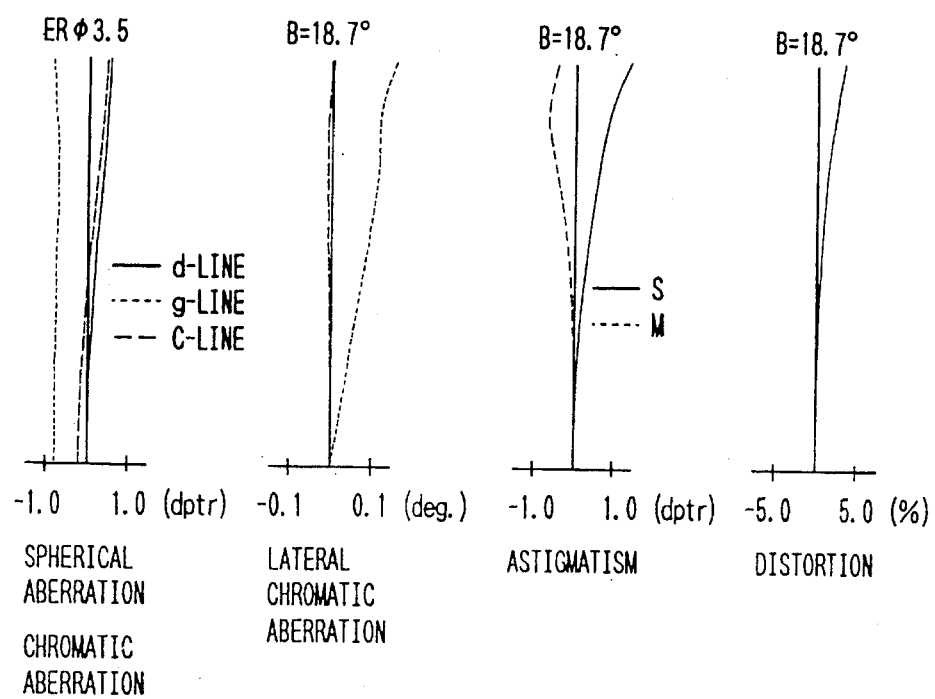
FIGS. 10, 12 and 14 are graphs plotting the aberation curves for the lens system shown in FIGS. 9, 11 and 13, respectively.
Figure 12:
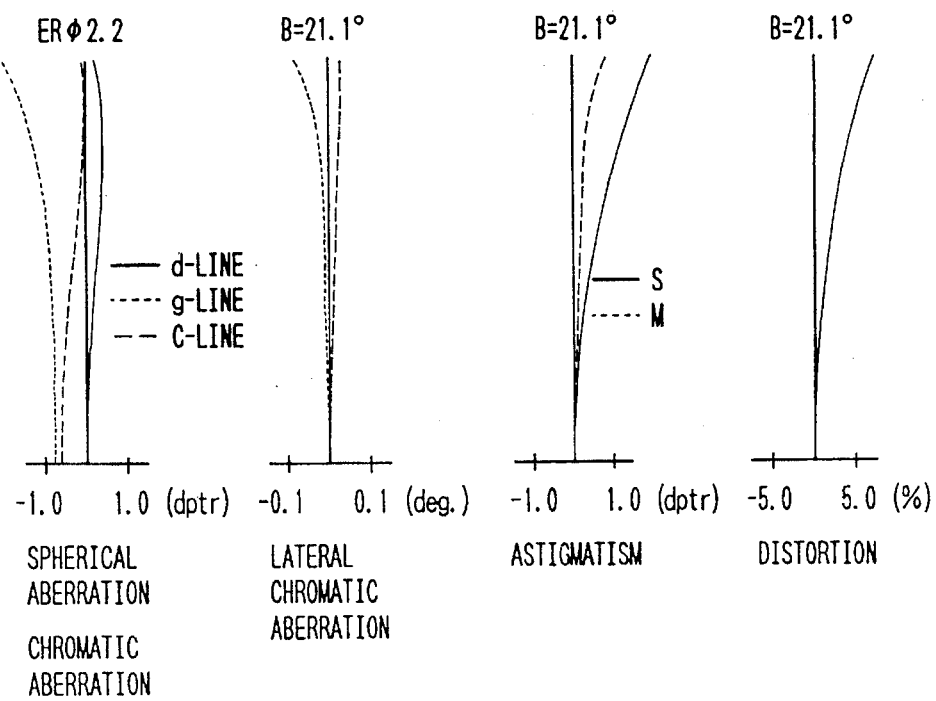
Figure 14:
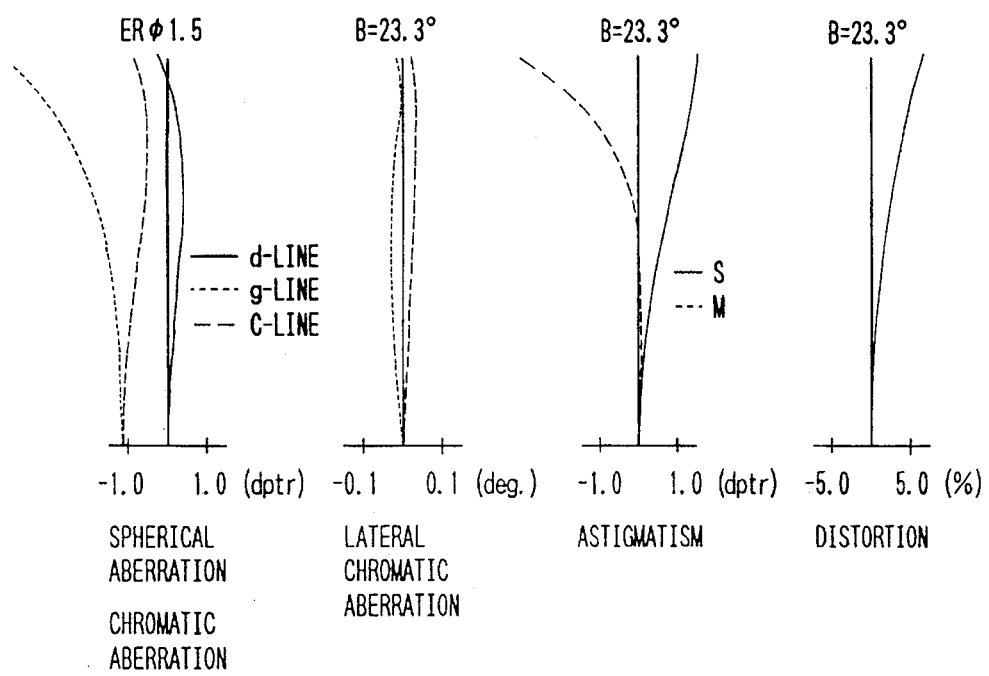

The aberration curves obtained with this lens composition are plotted in FIG. 10 for low magnification, in FIG. 12 for moderate magnification and in FIG. 14 for high magnification.

The results of a comparative experiment in which dioptry adjustment was effected by moving the second, third and fourth lens groups in unison are shown in the following Table 7.

TABLE 7

| Low magnification | Moderate magnification | High magnification |
| --- | --- | --- |
| −4.0 | −8.4 | −14.6 |
| −2.0 | −3.5 | −5.5 |
| −1.0 | −1.0 | −1.0 |
| 0.0 | +1.5 | +3.5 |
| +2.0 | +6.4 | +12.6 |

As can be seen from the description herein, the variations in focal length of the dioptry adjusting lens group that typically occur during zooming can be eliminated, thus preventing the occurrence of eyesight mismatch during zooming.

What is claimed is:

1. An afocal zooming optical system comprising a plurality of lens components arranged between an object side and an image side, in which some of the lens components are moved along an optical axis for changing the magnification of the optical system, and wherein dioptry adjustment is performed by moving at least one dioptry adjustment lens component without moving any of the lens components that are moved for changing the magnification of the optical system.

2. A afocal zooming optical system according to claim 1, wherein dioptry adjustment is performed by moving only one lens component.

3. An afocal zooming optical system according to claim 2, wherein said dioptry adjustment lens component is a lens component closest to said image side.

4. An afocal zooming optical system comprising, in order from the object side, a positive first lens component, a negative second lens component, a positive third lens component and a positive fourth lens component, said optical system changing magnification by moving said second and third lens components along the optical axis while performing dioptry adjustment by moving at least part of said fourth lens component along the optical axis without moving said second or third lens components.

5. An afocal zooming optical system according to claim 4, which satisfied the following condition:

$fG4/fG3<2.0$ where fG3 and fG4 denote the focal lengths of the components, respectively.

6. An afocal zooming optical system according to claim 4, further comprising:

a field ring disposed between the negative second lens component and the positive third lens component.

* * * * *

UNITED STATES PATENT AND TRADEMARK OFFICE
CERTIFICATE OF CORRECTION

PATENT NO. : 5,504,624
DATED : April 2, 1996
INVENTOR(S) : Hiroyuki Kato

It is certified that error appears in the above-indentified patent and that said Letters Patent is hereby corrected as shown below:

On the title page, Item [73], please delete "Asashi" insert --Asahi--.

Signed and Sealed this

Thirteenth Day of August, 1996

Attest:

BRUCE LEHMAN

*Attesting Officer*  Commissioner of Patents and Trademarks